May 15, 1962  E. J. MILLER  3,034,322
DIFFERENTIAL TORQUE EQUALIZER

Filed May 5, 1960  3 Sheets-Sheet 1

INVENTOR.
EUGENE J. MILLER
BY Robert H Wendt
his atty.

May 15, 1962      E. J. MILLER      3,034,322

DIFFERENTIAL TORQUE EQUALIZER

Filed May 5, 1960      3 Sheets-Sheet 2

INVENTOR.
EUGENE J. MILLER
BY Robert H Wendt
his atty

May 15, 1962 E. J. MILLER 3,034,322
DIFFERENTIAL TORQUE EQUALIZER
Filed May 5, 1960 3 Sheets-Sheet 3

INVENTOR.
EUGENE J. MILLER
BY Robert H. Winter
his attorney

United States Patent Office 3,034,322
Patented May 15, 1962

3,034,322
DIFFERENTIAL TORQUE EQUALIZER
Eugene J. Miller, 411 Oak Ave., McHenry, Ill.
Filed May 5, 1960, Ser. No. 26,989
2 Claims. (Cl. 64—26)

The present invention relates to differentials for driving the opposite drive wheels or tracks of vehicles or earth moving machinery, and is particularly concerned with a torque equalizing device whereby either of the wheels is prevented from spinning when it loses its traction engagement with the ground; and the resulting motion of the wheel which has lost is traction engagement is transmitted back to the other wheel through a hydraulically driven torque equalizer.

One of the objects of the invention is the provision of such a differential torque equalizer for the opposite wheels of differentially driven vehicles which permits the flexibility and differential of speed that is necessary for such differentially driven wheels to turn corners.

Another object of the invention is the provision of such a differential torque equalizer which is simple in construction, which has a minimum number of parts, which is adapted to be manufactured economically, and which does not depend for its action on the application of a brake, but which is automatic in transmitting the motion of a wheel or shaft which tends to slip back to the other shaft of the differential, and thus tends to equalize the traction.

Another object of the invention is the provision of such a differential torque equalizer which utilizes a hydraulically driven connection between the two driven shafts of a differential that can be enclosed in the same differential housing, and which utilizes the same oil or lubricant that is used for lubricating the differential, and in which the characteristics of the hydraulic drive may be adjusted to oils of different viscosity.

Another object of the invention is the provision of a plurality of differential torque equalizers which prevent either driven shaft from slipping without transmitting force back to the other shaft.

Another object of the invention is the provision of a plurality of different arrangements for differential drives by means of which the tendency of one wheel to slip causes the transmission of force in the nature of torque back to the other shaft and tending to increase its power and turning effort.

Other objects and advantages of the invention will be apparent from the following description and the accompanying drawings, in which similar characters of reference indicate similar parts throughout the several views.

Referring to the drawings, of which there are three sheets,

Figure 1:
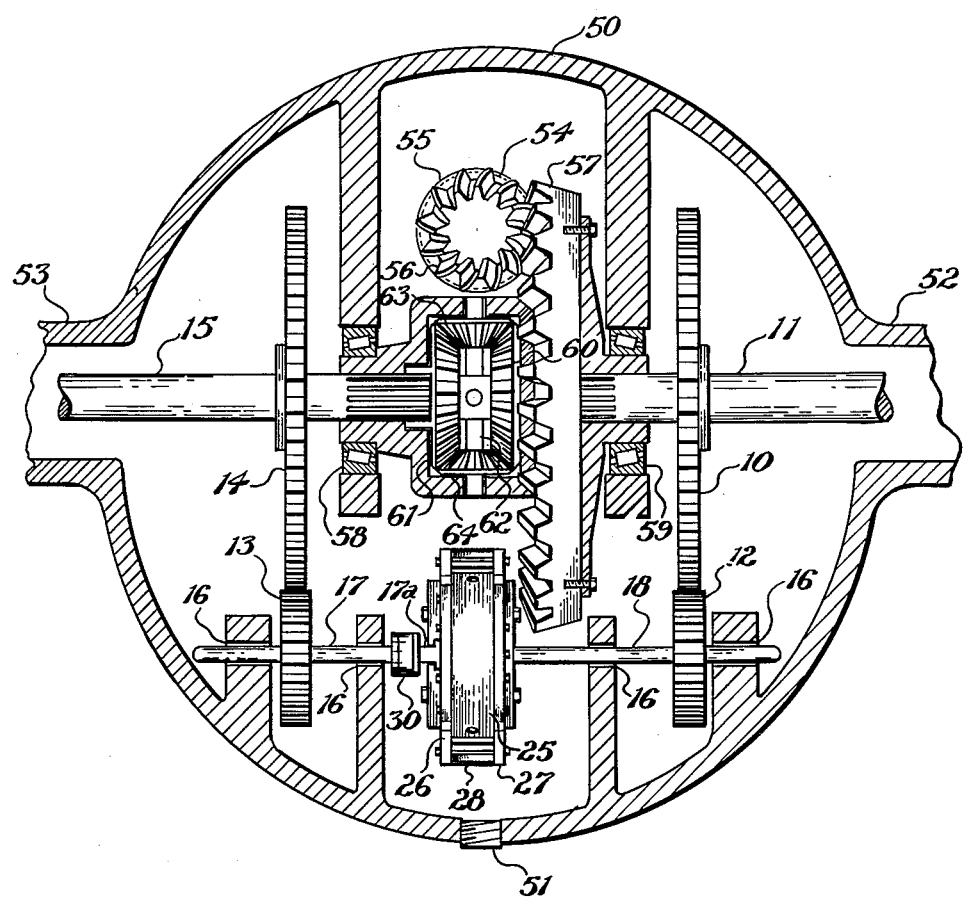
FIG. 1 is a diagrammatic assembly drawing of a differential torque equalizer embodying the invention.

Referring to FIG. 1, 50 indicates the differential housing provided with semi-solid lubricant and having the usual filling plug (not shown) and drain plug 51. The differential housing 50 has laterally extending tubular portions 52, 53 provided with ball bearings for rotatably supporting the shaft members 11 and 15.

The differential housing 50 has a forwardly extending tubular portion 54 provided with a suitable ball bearing 55 for supporting the drive shaft, having a driving gear 56, which is driven by the engine, and which drives a ring gear 57.

Roller bearings for supporting the shaft members 11 and 15 are indicated at 58 and 59; and the ring gear 57 is rotatably mounted on the shaft 11. Shaft 11 has a driven gear of the bevel type, indicated at 60, keyed to the shaft; and the shaft 15 has a bevel gear 61 keyed to the shaft.

Between the ends of the shaft members 11 and 15 there is mounted a spider 62, which has a plurality of bevel gears 63, 64 mounted thereon for engaging the bevel gears 59 and 60. One of the bevel gears 63, 64 is driven by the ring gear 57.

So far the differential may correspond to any conventional differential gear system in which the drive shaft 54 drives the ring gear 57, which drive the bevel gears 63 and 64 on the spider 62.

When the resistance to driving is equal on the shafts 11 and 15, they are driven with equal torque; but when the resistance or load on either shaft differs, they may be driven at different speeds; and when the vehicle turns a corner, the shafts 11 and 15 may be driven at different speeds to accommodate the different radii at which the wheels turn on the ground.

Whenever one wheel slips or the shafts 11 and 15 are driven at different speeds, the spider 62 with its bevel gears 63, 64 rotates and the bevel gears 63, 64 travel around the ring gear 57. If one traction wheel has a suitable driving traction and the other slips, then the power may be lost entirely at the slipping wheel; and it is the object of the present invention to equalize the torque on both axles to avoid such slipping.

The differential housing 50 is provided with auxiliary bearings 16 on its lower inner wall for rotatably supporting a pair of auxiliary shafts 17 and 18. The shaft 17 has pinion 13; and shaft 18 has pinion 12 keyed thereto.

Pinion 12 meshes with gear 10 keyed to shaft 11; and pinion 13 meshes with gear 14 keyed to shaft 15.

Shaft 18 has a housing 25 secured to the end of the shaft and provided with side plates 26, 27 and a peripheral wall 28, forming a hydraulic pump housing. A shaft extension 17a extends into the housing walls 26, 27 and is connected to shaft 17 by a flexible coupling 30.

Figure 3:
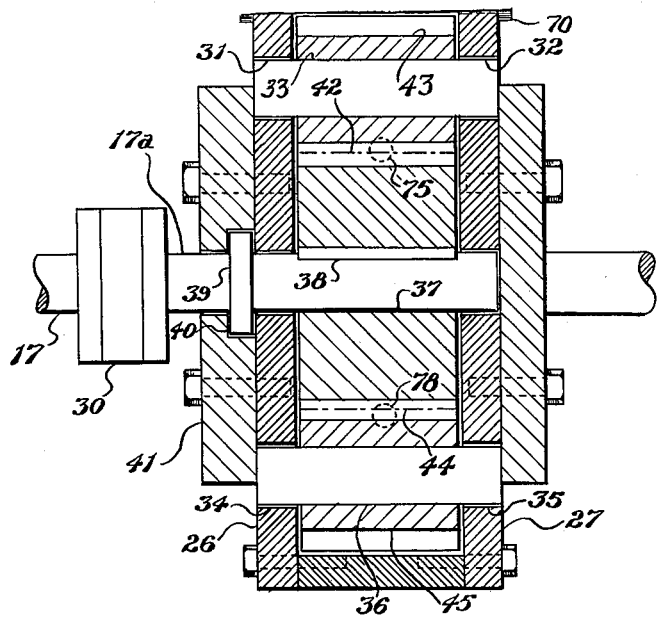
FIG. 3 is a fragmentary sectional view taken on the plane of the line 3—3 of FIG. 2.
Figure 2:
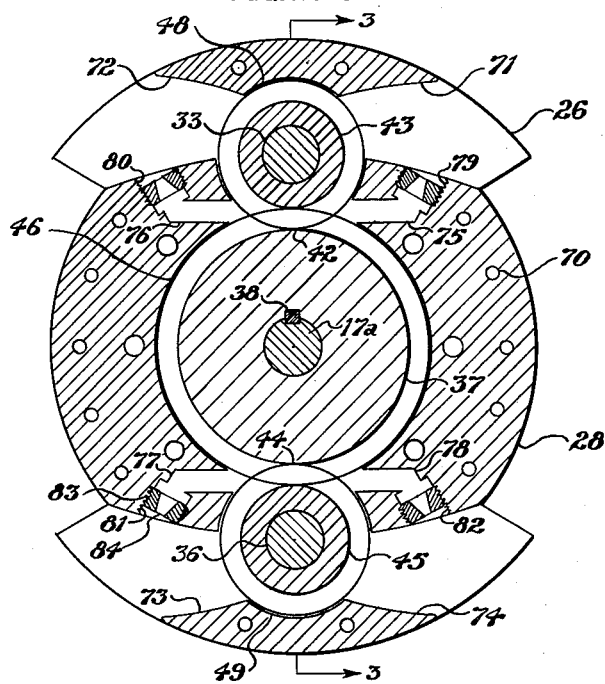
FIG. 2 is a side elevational view of the moving parts of the hydraulic equalizer.

One form of hydraulic pump which may be employed in the present device is the gear type, further details of which are shown in FIGS. 2 and 3. In such case the side plates 26 and 27 have bearings 31 and 32 rotatably supporting shaft 33 and bearings 34, 35 rotatably supporting shaft 36.

A central pumping gear 37 is keyed at 38 to the shaft 17a, which is held in the pump by an annular rib 39 engaged in an annular groove 40 in a plate 41 secured to side plate 26. Gear 37 meshes at 42 with gear 43 rotatably mounted on shaft 33 and also meshes at 44 with gear 45 rotatably mounted on shaft 36.

Referring to FIG. 2, the peripheral wall or middle plate 28 of the pump between the side plates 26 and 27 is formed with cylindrical bore 46 for housing the central gear 37; and bore 46 communicates with the parallel cylindrical bores 48 and 49 for the other gears 43 and 45.

The middle plate 28 of the pump is secured between the side plates by a plurality of through bolts 70; and the middle plate of the pump is provided with tapering inlet openings 71, 72, 73, 74; and the inlet openings 71, 72 lead to the gear 43, while inlet openings 73, 74 lead to the gear 45.

The central plate 28 of the pump is provided with outlet ports or conduits 75, 76, 77, 78; and each outlet port leads to an enlarged threaded bore 79, 80, 81, 82. Each threaded bore 79—82 has a threaded restriction plug 83 with a tapered opening 84; and the size of the opening 84 is proportioned to the viscosity of the oil employed.

The gears in the hydraulic pump rotate with the shaft 17, while the housing rotates with the shaft 18. The direction in which the shafts 17 and 18 rotate depends upon the rotation of the shafts 11 and 15; and when the traction is equal on both wheels, shafts 11 and 15 rotate at the same speed; and the same is true of the shafts 17 and 18, which cause the pump housing 25 to rotate, and gears 43, 37, 35 rotate without any pumping action.

The tapered openings 71—74 in the peripheral wall 28 of the pump constantly scoop in a supply of lubricant at one side or the other, depending on the direction in which the housing 25 is rotating, so that the gears are supplied with lubricant by this scooping action and by the fact that the pump is located in the lowest part of the oil filled differential housing.

When one wheel slips on the vehicle so that there is a tendency for one shaft 11 to rotate faster than the other shaft 15, the faster rotation of shaft 11 is transmitted by gear 10 to pinion 12 and shaft 18, which rotates the housing 25 relative to the pump gears and causes the gears to pump oil on one side or the other.

The flow of this oil is restricted at one of the outlet ports 75—78 by the restriction plugs 83; and torque is transmitted from shaft 18 to shaft 17 through the hydraulic pump.

Thus the tendency of the slipping wheel to slip is restrained; and the torque is equalized between the shafts 11 and 15.

Figure 4:
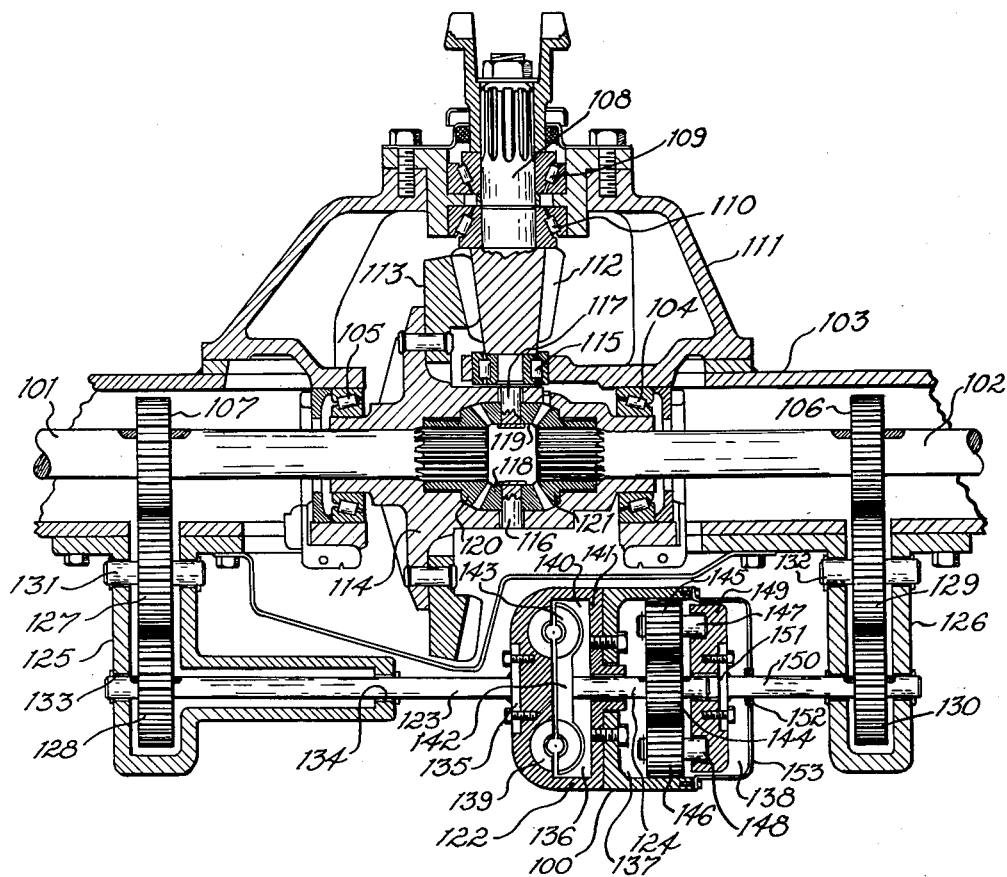
FIG. 4 is a similar view of a modification including a hydraulic torque equalizer.

Referring to FIG. 4, this is a view similar to FIG. 1 of a modification having a hydraulic drive unit 100 connected to the driven shafts to equalize the torque and prevent slipping of either wheel. In this modification there are two driven shafts 101 and 102 extending to driven wheels (not shown) where they are provided with suitable bearings (not shown).

The differential housing 103 is provided with the roller bearings 104 and 105 for the shafts 102, 101, which carry the gears 106, 107. The driving shaft is indicated at 108, where it is mounted in ball bearings 109, 110 in a housing extension 111. The driving shaft 108 carries the driving pinion 112, which engages with the teeth of the ring gear 113, which is attached to a rotatable housing 114.

The extension housing 111 carries another roller bearing 115 for the end of the driving shaft 108.

The ring gear housing 114 has a pair of stub shafts 116, 117 carrying bevel pinions 118, 119, which mesh with the bevel pinions 120, 121 carried by the driven shafts 101, 102, respectively. When the driving shaft 108 rotates, power is transmitted to both the driven shafts 101, 102 by the ring gear; and when the traction is equal, the power is equally divided between the two shafts; but if one shaft has a wheel that slips and the other wheel holds, the bevel gears 118—121 will permit one shaft to stand still, while the other rotates freely, were it not for the hydraulic connection between the two shafts 101, 102 which is provided by the hydraulic drive or torque equalizer 100.

This torque equalizer preferably comprises a separate housing 122 and a separate pair of aligned shafts 123, 124.

The differential housing 103 has a pair of additional extensions 125 and 126 containing gears 127, 128, 129, 130. Gears 127 and 129 are idler gears mounted on stub shafts 131, 132 in the housings 125, 126; and they mesh with gears 107 and 106, respectively.

Gear 128 is fixedly mounted on shaft 123, which has a bearing at 133 in the housing extension 125 and another bearing at 134 so that shaft 123 is driven by the train of gears 107, 127, 128.

The shaft 123 supports the housing 122 by means of the attaching flange 135; and housing 122 comprises a cylindrical member which is provided with an oil chamber 136, a gear chamber 137, and a universal chamber 138. The oil chamber 136 has a multiplicity of radially extending vanes 139 spaced from each other; and there are additional vanes 140 carried by the partition 141 on the other side of the oil chamber 136.

Between the vanes there is a rotor 142 carried by the end of shaft 124 and having similar vanes 143 between the vanes 139 and 140; and the chamber is filled with semi-solid lubricant or liquid lubricant, which produces a hydraulic connection between the vanes on shaft 123 and the vanes on shaft 124.

The shaft 124 extends into the gear housing 137, where it fixedly supports a gear 144 meshing with a pair of gears 145, 146. Gears 145, 146 are mounted on stub shafts 147, 148 carried by universal cross head 149, which is flexibly mounted on shaft 150 by means of plate 151.

Shaft 150 is in driving connection with driven shaft 102 through gears 106, 129, 130. A seal 152 surrounds shaft 150 in cover 153; and the chambers 137, 138 are also filled with lubricant.

The operation of the hydraulic drive 100 is as follows: When shaft 123 is rotated with respect to shaft 150, the vanes in the housing 122 tend to carry with them the lubricant in the chamber 136, which carries with it the vanes 142 on the shaft 124, driving the gear 144, which drives the gears 145, 146, causing the cross head 149 to rotate, and rotating the shaft 150.

Thus the driven shafts 101, 102 are connected by the hydraulic drive 100; and if one shaft tends to stand still while the other tends to slip and rotate, this is counteracted by the hydraulic drive 100, which transmits torque from the slipping shaft back to the other shaft, tending to equalize the torque between the two driven shafts.

The resistance developed in the drive 100 tends to drive the axle 101 through the shaft 123 and gear train 128, 127, 107. Also the resistance caused by the drive 100 tends to transmit power through gears 106, 129, 130 to the shaft 102 and back to the shaft 101 through the gears 121, 118, 119, 120.

It will thus be observed that the present device is adapted to prevent the slipping of either wheel due to loss of traction and due to the fact that the differential in traction is transmitted to the other shaft, while still permitting the wheels to rotate at different speeds while turning a corner.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A slip coupling for use as a differential torque equalizer with a differential driving gear comprising a differential housing having a supply of liquid lubricant and a pair of bearings, a torque equalizer shaft supported by said bearings, a universal coupling in said shaft between the ends thereof, a slip coupling housing mounted in said differential housing in position to be immersed in the lubricant, said slip coupling housing being mounted on said shaft, which comprises two sections, one section rotating in said housing and the other section having its end fixedly secured to said shaft to rotate the coupling housing with the shaft, said coupling housing comprising a pair of end plates, said end plates having bearings for supporting a pair of idler shafts between the end plates, said first shaft supporting a pumping gear in said slip coupling housing and said idler shafts each supporting a pumping gear meshing with the first pumping gear and driven thereby, said slip coupling housing including a housing about said three gears and formed with three intersecting cylindrical chambers for rotatably receiving said gears, said slip coupling housing being provided with a pair of diverging scooping inlets for each of the gears on the idler shaft and with a pair of outlets extending from the space between each pair of gears, the slip coupling being adapted to have either section of its shaft driven from a differential gear shaft to interpose a resistance to the relative rotation between the two shafts of a differential driving gear and to transmit back from one shaft of a different driving gear shaft to the other differential driving gear shaft.

2. A slip coupling according to claim 1, in which each of the outlets from said slip coupling housing is provided with a threaded bore and with a restricting nozzle resisting the discharge of liquid lubricant from the slip coupling and increasing the resistance to relative rotation between the shaft sections to which it is attached and increasing the tendency to transmit torque from one shaft section to the other.

References Cited in the file of this patent

UNITED STATES PATENTS

| | | |
|---|---|---|
| 1,636,050 | Fottinger | July 19, 1927 |
| 1,916,715 | Corey | July 4, 1933 |
| 2,548,195 | Chillson | Apr. 10, 1951 |
| 2,986,024 | Power | May 30, 1961 |

FOREIGN PATENTS

| | | |
|---|---|---|
| 170,941 | Austria | Apr. 10, 1952 |